Figures 1, 2:
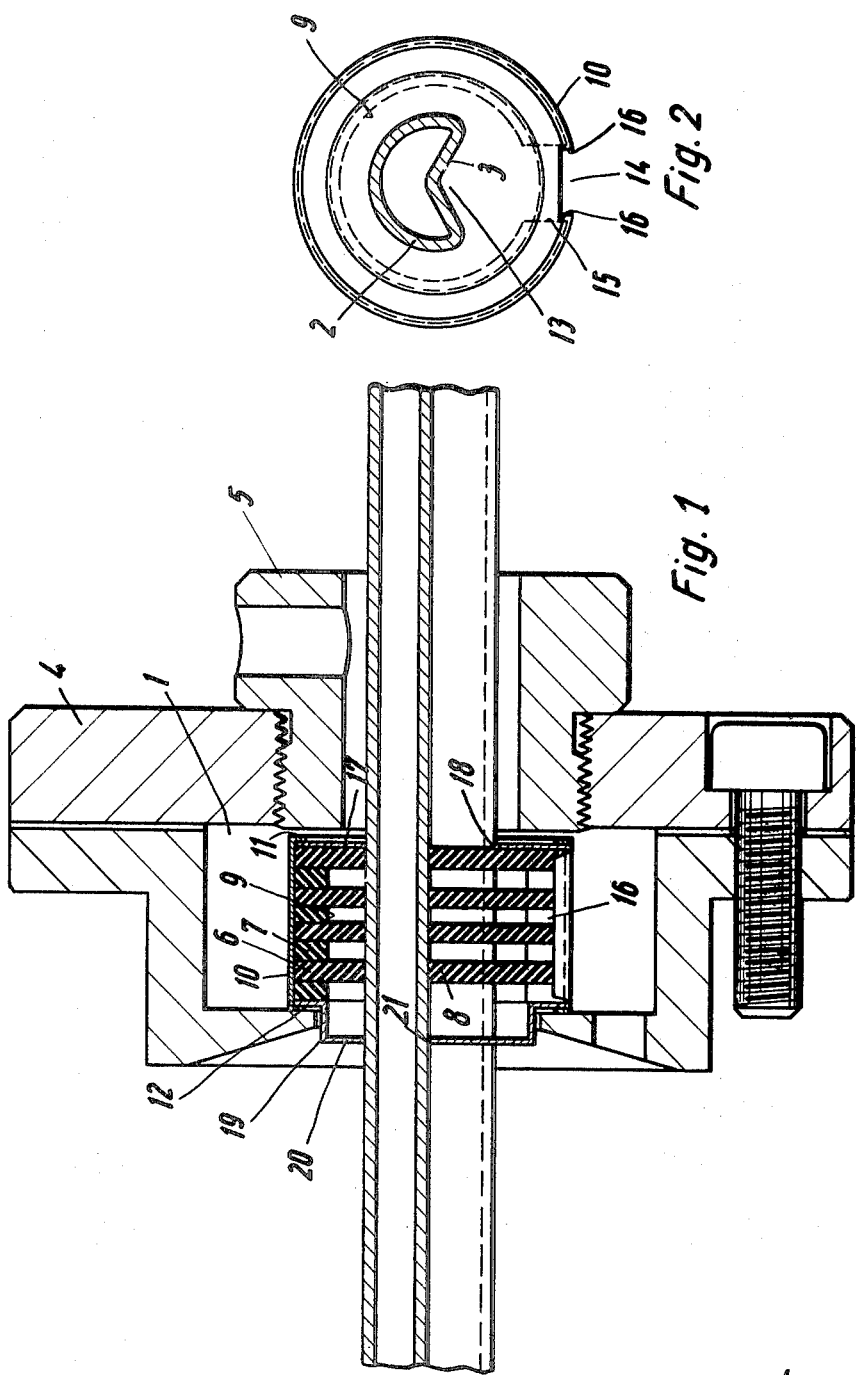

United States Patent

[11] 3,603,600

| [72] | Inventor | Adolf Lutz<br>Geisingen Andei, Germany |
|---|---|---|
| [21] | Appl. No. | 761,566 |
| [22] | Filed | Sept. 23, 1968 |
| [45] | Patented | Sept. 7, 1971 |
| [73] | Assignee | Karl Huller, GmbH<br>Germany |
| [32] | Priority | Sept. 27, 1967 |
| [33] | | Germany |
| [31] | | H 60333 |

[54] BORER SEAL
11 Claims, 2 Drawing Figs.

[52] U.S. Cl. ........................................... 277/81
[51] Int. Cl. .......................................... F16j 15/56
[50] Field of Search ........................... 277/35, 51, 81

[56] References Cited
UNITED STATES PATENTS

| 3,469,855 | 9/1969 | Enting | 277/35 X |
| 1,626,237 | 4/1927 | Hodgkinson | 277/81 X |
| 2,485,940 | 10/1949 | Tremolada | 277/51 |
| 2,723,867 | 11/1955 | Howard et al. | 277/51 X |
| 3,317,216 | 5/1967 | Muthler | 277/235 X |

*Primary Examiner*—Edward J. Michael
*Attorney*—Walter Becker

ABSTRACT: A borer seal, especially for bore hole tubes, which includes a plurality of coaxially arranged sealing discs arranged in axially spaced relationship to each other and provided with a central opening therethrough corresponding to the circumferential contour of the borer in connection with which the seal is to be used, and means connecting said sealing discs to each other to a single structural unit.

PATENTED SEP 7 1971

3,603,600

Inventor:
Adolf Lutz
By
Walter Becker

BORER SEAL

The present invention relates to a borer seal, especially for bore hole tubes with substantially parallel sealing discs in spaced relationship to each other which are provided with passages corresponding to the borer cross section.

Seals of this type for bore hole tubes are known which are formed by sealing discs rotating together with the borer and by stationary housing discs interposed between said rotating sealing discs so that such a seal acts in the manner of a labyrinth seal. The stationary housing discs determine the spacing between the sealing discs so that the latter cannot be pushed together when the borer advances. The housing discs are held together by screws having arranged thereon intermediate sleeves, said screws serving for connecting the seal to a housing. The disadvantage of this design consists in that the seal is composed of a relatively great number of separate elements so that the always necessary new installation of such seal is complicated and time consuming.

According to another heretofore known seal for bore hole tubes, it is necessary to place the housing discs and borer discs one after another onto the borer whereupon the housing is inserted into a carrier for a boring bushing and locked by means of a bayonet joint. Also, the assembly of this seal is complicated and time consuming.

It is, therefore, an object of the present invention to provide a borer seal of the above-mentioned general type which can be installed and removed in one operation.

It is another object of this invention to provide a seal as set forth in the preceding paragraph, which is simple in construction and inexpensive to manufacture.

These and other objects and advantages of the invention will appear more clearly from the following specification in connection with the accompanying drawing, in which:

FIG. 1 illustrates an axial section through a seal according to the invention; and FIG. 2 is a section along the line II—II of FIG. 1.

According to one borer seal, especially for bore hole tubes with sealing discs arranged in spaced relationship to each other and having passages in conformity with the cross section of the bore hole tube, the sealing discs are in connection with the present invention interconnected while forming a closed structural unit so that all of the sealing discs can in one operation and together be placed upon the borer in a minimum of time.

The sealing discs may in any desired manner be fixed in their desired spaced relationship to each other. It is, however, particularly advantageous to provide spacer discs between the sealing discs, the inner diameter of said spacer discs being greater than that of the borer so that by this arrangement there is additionally created a type of labyrinth.

Advantageously, the sealing discs have their inner surfaces provided with protrusions in conformity with the longitudinal groove of the borer, so that the sealing discs rest against the borer over the entire surface while the spacer discs in this range are preferably spaced in such a way that the spacer discs merely form partial rings.

According to a further development of the invention, the sealing discs and the spacer discs have approximately the same diameter whereby they can easily be fastened.

According to a preferred embodiment of the invention, the discs are at their circumference, preferably within the area of the protrusions of the sealing discs, provided with a common recess engaged by at least one positive member for preventing rotation of said sealing discs. By means of said positive member, the precise location of the serially arranged sealing discs will be determined. The said positive members may in a simple manner be designed as angled-off edges which engage the two sidewalls of the groovelike recess.

For purposes of increasing the sealing effect of the borer seal according to the invention, the spacer mans may consist of rubber elastic material such as rubber, synthetic material, or the like.

The sealing discs and the spacer means may in a simple manner have those surfaces thereof which face each other connected, for instance, by means of cementing.

However, it is also possible to connect the sealing discs to each other through a circumferential member which may, for instance, be formed by a mantle. In such an instance, said mantle is advantageously provided with positive members for preventing the sealing discs from rotating relative to each other.

According to a further development of the present invention, the mantle on at least one end face is designed closed with the exception of a passage for the borer. In this connection, a disc is advantageously provided on the end face of the mantle. This disc has a passage which preferably corresponds to the outer contour of the borer, so that the said disc is also positively connected to the borer.

It is particularly advantageous to provide at least one end face of the mantle with a cup-shaped portion which has a protruding section of a smaller diameter than the mantle. The passage of said protruding section preferably corresponds to the cross section of the borer so that the borer seal is through said portion positively connected to the borer and will be rotated by the latter without exerting stresses, especially unilateral stresses, upon the elastic sealing discs.

In connection with the present invention it is to be borne in mind that the mass of the seal, and in particular the inertia thereof, is as small as possible. To this end, the diameter of the seal is selected as short as possible and/or for the circumferential mantle there is selected a material such as aluminum, which has a minimum of weight.

Referring now to the drawings in detail, it will be seen therefrom that the seal 1 is provided for a bore hole tube 2 which over its longitudinal extension is pressed in to such an extent that it will have an outer contour with a groove 3 of V-shaped cross section. The seal 1 is arranged in a housing 4 which, in turn, is mounted on a nonillustrated housing for a carrier for a drill jig bushing. This carrier serves for receiving a drill jig bushing for guiding the borer 2. One side of said sealing housing 4 is adapted to be closed by a screw cover 5 which is coaxial to the borer 2 while the opening which is closed by the cover 5 is greater than the diameter of the seal 1.

The seal 1 has four coaxially arranged and axially spaced sealing discs 6 of synthetic material or any other suitable elastic material. Between the sealing discs 6 and ahead of that sealing disc 6 which is located toward the borer tip there are provided four spacer discs 7. The passages 8 of the sealing discs 6 respectively have a shape which corresponds to the cross section of the borer 2 so that the inner surfaces of said passages 8 sealingly engage the circumference of the borer 2 over the entire circumferential contour. The cylindrical inner surface 9 of the spacer discs 7, however, are considerably greater in diameter than the outer diameter of the cylindrical portion of the borer 2.

The outer diameters of all of the sealing discs 6 and spacer discs 7 are the same. The discs 6 and 7 which have those faces thereof which face each other in engagement with each other are arranged in a substantially cylindrical mantle portion 10. Both marginal areas 11, 12 of said mantle portion 10 which extend in circumferential direction are at a right angle folded over inwardly and the mantle portion 10 has its inner surface in engagement with the circumferential surfaces of the discs 6 and 7.

The sealing discs 6 which at their passages 8 are provided with protrusions 13 engaging the groove 3 of the borer 2 are at this side circumferentially provided with a groove-shaped recess 14. The spacer discs 7 are within this range slotted over a width which corresponds to the width of the grooves 14, in such a way that in view of these slots 15, the spacer discs 7 extend only over a portion of a circle. The sidewalls of the grooves 14 and slots 15 of those discs 6 and 7 which rest against each other are engaged by angled-off webs 16 of the mantle 10 in such a way that the discs 6 and 7 are prevented from rotating relative to each other.

The rear end of the seal 1 is provided with an annular discs 17 which preferably consists of the same material as the mantle 10. Said annular discs 17 is by means of the folded-over marginal zone 11 of mantle 10 held between said marginal zone 11 and the rear sealing disc 6. The passage 18 of this end disc 17 has the same shape as the sealing disc 6.

The front end of the seal 1 is provided with a cover member 19 having a cup-shaped outwardly protruding portion 20 which is located in a bore of the housing 4 and has a passage 21 for the borer 2 which corresponds precisely to the cross section of the borer 2. The cover member 19 is held between the front spacer disc 7 and the front inwardly folded marginal zone 12 of the mantle 10. In view of this design of the cover member 19, the seal 1 is moved in the direction of rotation of the borer 2 by the latter and through the intervention of the cover member 19 or mantle 10 connected thereto.

As will be seen from the above, the seal according to the invention is simple in construction and inexpensive in production. Furthermore, the seal according to the invention can be assembled in a very simple manner. When the seal has been worn or damaged and is to be exchanged, the seal may be discarded in view of the fact that it is inexpensive.

It is, of course, to be understood, that the present invention is not limited to the specific embodiment shown in the drawing, but that modifications may be made within the scope of the appended claims.

I claim:

1. A borer seal, especially for bore hole tubes, which includes in combination: a plurality of coaxially located and serially arranged multiple sealing discs in axially spaced relationship parallel to each other and provided with a central opening therethrough corresponding to the circumferential contour of the borer in connection with which said discs rotate and with which the seal is to be used, and cup-shaped means including an outwardly protruding torsionally stiff shielding cover portion that protects against damage by material removed by borer operation and connecting said sealing discs to each other to form a single structural unit rotating with the borer.

2. A seal in combination according to claim 1, which includes a plurality of spacer discs respectively interposed axially between each adjacent two sealing discs and provided with a central passage therethrough having a diameter internally greater than that of the central opening in each of said sealing discs.

3. A seal in combination according to claim 1, in which said sealing discs at their openings are provided with protruding portions for engaging a longitudinal groove extending in the longitudinal direction of the borer in connection with which the seal is to be used.

4. A seal in combination according to claim 1, which includes: mantle means surrounding said sealing discs and provided with substantially radially inwardly extending web protrusions, said sealing discs having the periphery thereof provided with recess means engaged by said protrusions for preventing rotation of said sealing discs relative to each other and said mantle means.

5. A seal in combination according to claim 4, which includes a plurality of spacer discs respectively interposed axially between each adjacent two sealing discs and having an outer diameter approximately equaling that of said sealing discs, and in which the periphery of said spacer discs is provided with slot means engaged by the protrusions of said mantle means.

6. A seal in combination according to claim 4, in which said protrusions are formed by radially inwardly angled-off portions of said mantle means.

7. A seal in combination according to claim 2, in which said spacer means are resilient and made of rubber material.

8. A seal in combination according to claim 2, in which said spacer discs and said sealing discs have those sides thereof which face each other cemented directly to each other.

9. A seal in combination according to claim 4, which includes closure means provided at least at one end face of said mantle means and provided with a passage corresponding to the outer peripheral contour of the bore in connection with which the seal is to be used.

10. A seal in combination according to claim 9, in which said closure means at last at one end face of said mantle means is formed by a disc.

11. A seal in combination according to claim 9, in which said closure means complements said cup-shaped portion arranged at least at one end face of said housing means and having an outer diameter less than the outer diameter of said mantle means, said cup-shaped portion being provided with a passage therethrough for passing a borer therethrough in connection with which the seal is to be used.